United States Patent [19]
Dunn

[11] Patent Number: 5,835,773
[45] Date of Patent: Nov. 10, 1998

[54] METHOD FOR ACHIEVING NATIVE PERFORMANCE ACROSS A SET OF INCOMPATIBLE ARCHITECTURES USING A SINGLE BINARY FILE

[75] Inventor: David A. Dunn, San Jose, Calif.

[73] Assignee: Hewlett-Packard, Co., Palo Alto, Calif.

[21] Appl. No.: 633,615

[22] Filed: Apr. 17, 1996

[51] Int. Cl.⁶ .................................................. G06F 9/45
[52] U.S. Cl. ............................................ 395/705; 395/500
[58] Field of Search ................................ 395/500, 705, 395/709

[56] References Cited

U.S. PATENT DOCUMENTS

| | | | |
|---|---|---|---|
| 5,313,614 | 5/1994 | Goettelmann et al. | 395/500 |
| 5,355,491 | 10/1994 | Lawlor et al. | 395/700 |
| 5,432,937 | 7/1995 | Tevanian et al. | 395/700 |
| 5,590,331 | 12/1996 | Lewis et al. | 395/708 |

OTHER PUBLICATIONS

K. Andrews, et al., Migrating a CISC Computer Family onto RISC via Object Code Translation, Oct. 1992, pp. 213–322.
T.R. Halfhill, Emulation: RISC's Secret Weapon, Apr. 1994, Byte Magazine, pp. 119, 120, 122, 124, 126, 128, 130.
"The XDOS Binary Code Conversion System", Banning, IEEE, 1989, pp. 282–287.

Primary Examiner—James P. Trammell
Assistant Examiner—Kakali Chaki
Attorney, Agent, or Firm—Jack Lenell

[57] ABSTRACT

A method and article of manufacture for providing a balanced tradeoff between size of a single binary file and performance of that binary on various computer architectures of a wide range of computer platforms. The invention includes identifying performance critical source code and complementary source code having less performance criticality than the performance critical source code. The performance critical source code is compiled so as to generate performance critical object code for a first computer architecture, or an additional plurality of computer architectures as desired. The complementary source code is compiled so as to generate complementary object code for a particular computer architecture, selected as a generic computer architecture, which is different than at least one of the plurality of computer architectures. Subsequent storage on a computer usable medium such as a floppy disk provides for convenient distribution of computer readable program code, preferably embodied in a single architecture independent executable binary file that includes the performance critical object code for the plurality of computer architectures, as well as the complementary object code. The complementary object code has less performance criticality than the performance critical object code so as to reduce overall performance effects of subsequent translation of the complementary code to any desired computer architecture.

21 Claims, 1 Drawing Sheet

METHOD FOR ACHIEVING NATIVE PERFORMANCE ACROSS A SET OF INCOMPATIBLE ARCHITECTURES USING A SINGLE BINARY FILE

FIELD OF THE INVENTION

The invention relates to the field of generating and executing programs for digital computer systems.

BACKGROUND OF THE INVENTION

In the past, software vendors have been limited to providing a software product that is only compatible with an operating system that runs on just one computer platform. However, now a wide range of computer platforms that provide various levels of computing performance can run a common operating system. Since lower cost platforms provide lower performance, while higher cost platforms provide higher performance, computer users advantageously scale what they pay for a particular computer platform in accordance with a desired level of computing performance. Software vendors now have an opportunity to provide a software product that runs on the common operating system on the wide range computer platforms.

Despite some compatibility provided by the common operating system, software vendors are still limited by incompatible computer architectures. Lower performance computer platforms include computer architectures that are incompatible with computer architectures of higher performance computer platforms. A simple example of such incompatibility is incompatible instructions set architectures of the computer platforms. However, even among platforms having the same instruction set architecture, there are further incompatibilities caused by significantly different performance characteristics of different micro-architectures.

Among various previously known strategies employed by software vendors for coping with such computer architecture incompatibilities, each includes an undesirable trade off.

A first strategy is for software vendors to distribute intermediate code, which requires end users to generate optimized binary files for execution on their particular computer platform. A disadvantage of this strategy is an undesirable increase in machine resources and in skill level required by the end users.

Another strategy is for software vendors to support only a subset architecture that is common to the otherwise incompatible computer architecture. A disadvantage of this strategy is that it gives up much of the performance that could be gained by exploiting all of the features of each computer architecture of the wide range of computer platforms.

Yet another strategy is using emulation of a single binary. While this provides good compatibility across a set of instruction set architectures, resulting performance is typically an order of magnitude lower than a native binary.

Yet another strategy is performing dynamic translation from one instruction set architecture to another instruction set architecture while performing local performance optimization. Unfortunately, overall performance is still limited, since more global optimizations such as cache padding, inlining, global code motion, and the like, may be very difficult to perform using dynamic translation.

Yet another strategy is for software vendors to distribute so called "chubby" binaries, which are very large files that include duplication in multiple versions of all code, so that each version performs well on at least one of the computer platforms. However, this results in computer platform resources being consumed by very large files. Since a large amount of this duplicated code is not performance critical, some of the increase in space usage does not provide a major advantage in performance.

What is needed is a method and article of manufacture for a balanced tradeoff between size of a single binary and performance of that binary on various computer architectures of a wide range of computer platforms.

SUMMARY OF THE INVENTION

The present invention provides a method and article of manufacture for a balanced tradeoff between size of a single binary file and performance of that binary on various computer architectures of a wide range of computer platforms.

In accordance with the teachings of the invention, a majority of execution time of most programs is spent executing a relatively small section of the binary. Only these sections need to be native compiled for full performance on a desired computer architecture. A complementary remainder of the program can be dynamically translated from a particular computer architecture, selected as a generic architecture, to the desired architecture with little loss in overall performance. Another advantage is the modular construction of the binary, which provides for end users to easily strip out of the binary any support for undesired computer architectures.

Briefly and in general terms the invention includes identifying performance critical source code and complementary source code having less performance criticality than the performance critical source code. The performance critical source code is compiled so as to generate performance critical object code for a first computer architecture, or an additional plurality of computer architectures as desired. The complementary source code is compiled so as to generate complementary object code for the so called generic computer architecture, which is different than at least one of the plurality of computer architectures. As will be discussed in greater detail subsequently herein, the complementary object code has less performance criticality than the performance critical object code so as to reduce overall performance effects of subsequent translation of the complementary code to any desired computer architecture.

For convenient distribution, computer readable program code is preferably embodied in a single architecture independent executable binary file that includes the performance critical object code for the plurality of computer architectures, as well as the complementary object code. Subsequent storage of the computer readable program code on a computer usable medium such as a floppy disk further aids in distribution.

In accordance with the principles of the invention, after such distribution the file is opened for execution on a computer having the desired computer architecture by loading the performance critical object code for the desired computer architecture from among the performance critical object code for the plurality of computer architectures. The complementary object code is loaded, and is translated to the desired computer architecture if the so called generic computer architecture is different than the desired computer architecture.

Other aspects and advantages of the present invention will become apparent from the following detailed description, taken in conjunction with the accompanying drawing, illustrating by way of example the principles of the invention.

DETAILED DESCRIPTION OF THE PREFERRED EMBODIMENT

Figure 1:
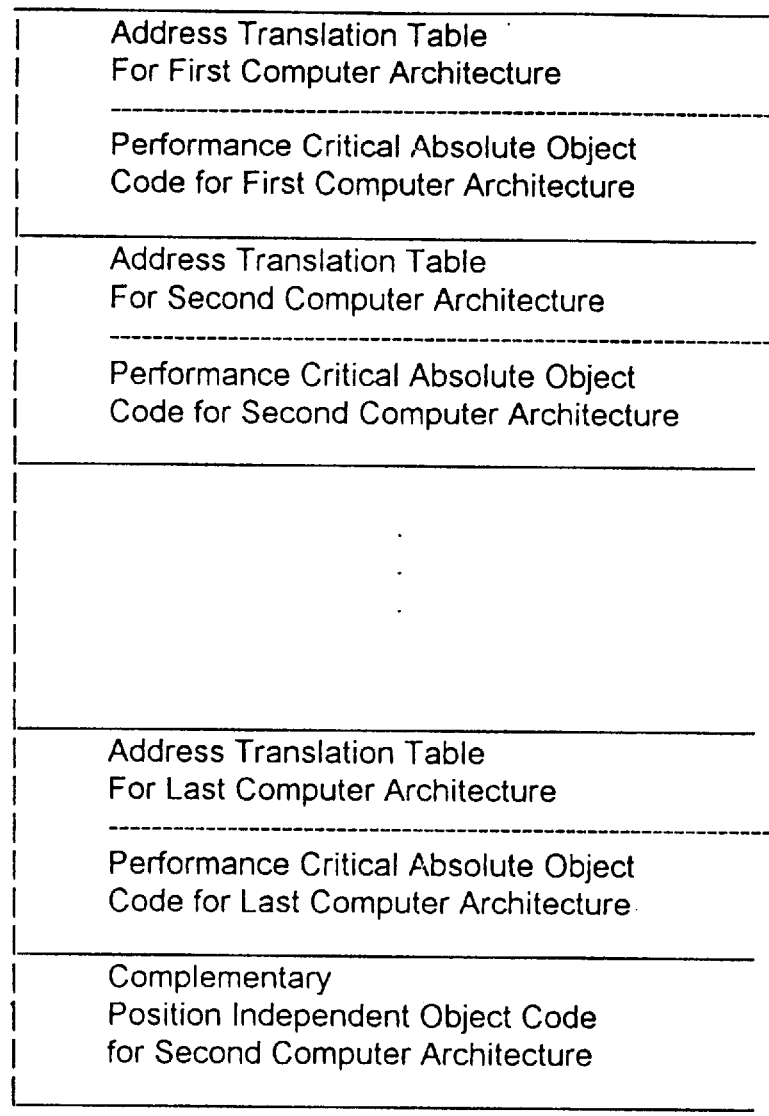
FIG. 1 shows a block diagram of a single architecture independent executable binary file of the present invention.

In the preferred embodiment of the invention, software performance analysis techniques are employed to identify performance critical source code and complementary source code having less performance criticality than the performance critical source code. Performance criticality is defined in terms of frequency of execution. Upon compilation and execution, analysis reveals that the performance critical source code is more frequently executed than the complementary source code.

The performance critical source code is compiled so as to generate performance critical object code for a first computer architecture, or an additional plurality of computer architectures as desired. The complementary source code is compiled so as to generate complementary object code for the so called generic computer architecture, which is different than at least one of the plurality of computer architectures.

FIG. 1 shows a block diagram of a single architecture independent executable binary file of the present invention. In the preferred embodiment, the performance critical object code for each one of the plurality of computer architectures includes performance critical absolute object code for the respective computer architecture and an address translation table for the performance critical absolute object code for the respective computer architecture.

For example, as shown in FIG. 1. within the file the performance critical object code for the first computer architecture includes performance critical absolute object code for the first computer architecture and an address translation table for the performance critical absolute object code for the first computer architecture. Similarly, the performance critical object code for the second computer architecture includes performance critical absolute object code for the second computer architecture and an address translation table for the performance critical absolute object code for the second computer architecture.

The complementary object code has less performance criticality than the performance critical object code so as to reduce overall performance effects of subsequent translation of the complementary code to any desired computer architecture. Preferably, all desired computer architectures are equipped with an appropriate dynamic translator for translating from the so called generic computer architecture to the desired computer architecture. Helpful discussions by William B. Buzby in U.S. patent application Ser. No. 08/616608 filed Mar. 15, 1996 and entitled "Use of Dynamic Translation to Collect and Exploit Run-Time Information in an Optimizing Compilation System" are incorporated herein by reference. While dynamic translation as described therein is preferred, it should be understood that use of various translation techniques in conjunction with the invention provide beneficial results.

In the preferred embodiment, the complementary object code is position independent object code, which is particularly advantageous for use in conjunction with dynamic translation. All addresses for program data and any code located in the performance critical section are stored in the address translation table for each specific architecture. This system advantageously provides for code and data symbols being placed differently on various computer architectures; only forcing the translation table to be of identical layout. This is advantageous since different architectures need different data layout for maximum performance, and some computer architectures will have larger code size for routines in the performance critical object code.

Preferably, the binary file includes performance critical object code for the so called generic computer architecture. Since in the preferred embodiment all computer platforms that can execute any of the performance critical object code will have a dynamic translator for the so called generic computer architecture, each computer platform can execute the binary file, even if not at native performance.

The binary file is preferably stored on a computer usable medium such as a floppy disk to provide for convenient distribution of computer readable program code. In accordance with the principles of the invention, after such distribution the file is opened for execution on a computer having the desired computer architecture by loading the performance critical object code for the desired computer architecture from among the performance critical object code for the plurality of computer architectures. The complementary object code is translated to the desired computer architecture if the so called generic computer architecture is different than the desired computer architecture, and is loaded.

When the dynamic translator converts an access to an address within the address translation table, the address is mapped to the actual address within the object code compiled for that computer architecture. This is similar to mapping done for code addresses in dynamic object code translation, except the address translation table contains the starting addresses for data symbols. This provides for the translator directly materializing the constant address in-line, rather than referencing the translation table. Since the native code for the performance critical object code contains the address translation table, there is no need to make the performance critical code position independent.

The present invention provides a method and article of manufacture for a balanced tradeoff between size of a single binary file and performance of that binary on various computer architectures of a wide range of computer platforms. Although specific embodiments of the invention have been described and illustrated, the invention is not to be limited to the specific forms or arrangements of parts so described and illustrated, and various modifications and changes can be made without departing from the scope and spirit of the invention. Within the scope of the appended claims, therefor, the invention may be practiced otherwise than as specifically described and illustrated.

What is claimed is:

1. A method comprising the steps of:
   identifying performance critical source code and complementary source code having less performance criticality than the performance critical source code, wherein the performance critical source code and the complementary source code are characterized in terms of execution frequency to determine performance criticality;
   compiling the performance critical source code so as to generate performance critical object code for a first computer architecture; and
   compiling the complementary source code so as to generate complementary object code for a second computer architecture that is different than the first computer architecture, the complementary object code having less performance criticality than the performance critical object code.

2. A method as in claim 1 further comprising a step of compiling the performance critical source code so as to generate performance critical object code for the second computer architecture.

3. A method as in claim 2 further comprising a step of storing the performance critical object code for the first computer architecture, the performance critical object code for the second computer architecture, and the complementary object code for the second computer architecture on a computer usable medium.

4. A method as in claim 2 further comprising a step of executing both the performance critical object code for the second computer architecture and the complementary object code for the second computer architecture on a computer having the second computer architecture.

5. A method as in claim 1 further comprising a step of compiling the performance critical source code so as to generate performance critical object code for a plurality of computer architectures that are different that the first computer architecture.

6. A method as in claim 5 further comprising a step of storing the performance critical object code for the first computer architecture, the performance critical object code for the plurality of computer architectures, and the complementary object code for the second computer architecture on a computer usable medium.

7. A method as in claim 1 further comprising a step of storing the performance critical object code for the first computer architecture and the complementary object code for the second computer architecture on a computer usable medium.

8. A method as in claim 1 further comprising a step of dynamically translating the complementary object code from the second computer architecture to the first computer architecture.

9. A method as in claim 8 further comprising a step of executing both the performance critical object code for the first computer architecture and the complementary object code translated for the first computer architecture on a computer having the first computer architecture.

10. A method comprising the steps of:
   identifying performance critical source code and complementary source code having less performance criticality than the performance critical source code;
   compiling the performance critical source code so as to generate performance critical object code for a first computer architecture:
   compiling the performance critical source code so as to generate performance critical object code for a plurality of computer architectures that are different that the first computer architecture;
   compiling the complementary source code so as to generate complementary object code for a second computer architecture that is different than the first computer architecture the complementary object code having less performance criticality than the performance critical object code; and
   translating the complementary object code from the second computer architecture to one of the plurality of computer architectures.

11. A method as in claim 10 further comprising a step of executing both the performance critical object code for the one of the plurality of computer architectures and the complementary object code translated for the one of the plurality of computer architectures on a computer having the one of the plurality of computer architectures.

12. An article of manufacture comprising:
   a computer usable medium having computer readable program code embodied therein including:
   performance critical object code for a first computer architecture; and
   complementary object code for a second computer architecture that is different than the first computer architecture, the complementary object code having less performance criticality than the performance critical object code so as to reduce overall performance effects of subsequent translation of the complementary object code from the second computer architecture to the first computer architecture.

13. An article of manufacture as in claim 12 wherein the computer readable program code further includes performance critical object code for the second computer architecture.

14. An article of manufacture as in claim 13 wherein the performance critical object code for the second computer architecture includes performance critical absolute object code for the second computer architecture and an address translation table for the performance critical absolute object code for the second computer architecture.

15. An article of manufacture as in claim 12 wherein the computer readable program code further includes performance critical object code for a plurality of computer architectures that are different that the first computer architecture.

16. An article of manufacture as in claim 15 wherein the performance critical object code for each one of the plurality of computer architectures includes performance critical absolute object code for the respective computer architecture and an address translation table for the performance critical absolute object code for the respective computer architecture.

17. An article of manufacture as in claim 12 wherein the performance critical object code for the first computer architecture includes performance critical absolute object code for the first computer architecture and an address translation table for the performance critical absolute object code for the first computer architecture.

18. An article of manufacture as in claim 12 wherein the complementary object code for the second computer architecture includes complementary position independent object code for the second computer architecture.

19. An article of manufacture as in claim 12 wherein computer readable program code is embodied in the computer usable medium as a single binary file.

20. A method for opening an architecture independent executable file comprising the steps of:
   providing the architecture independent executable file embodied in the computer usable medium and including performance critical object code for a plurality of computer architectures and complementary object code for a computer architecture that is different than at least one of the plurality of computer architectures;
   loading the performance critical object code for a desired computer architecture from among the performance critical object code for the plurality of computer architectures;
   loading the complementary object code; and
   translating the complementary object code to the desired computer architecture if the complementary object code is for a computer architecture that is different than the desired computer architecture.

21. A method as in claim 20 wherein the step of translating the complementary object code includes dynamically translating the complementary object code to the desired computer architecture if the complementary object code is for a computer architecture that is different than the desired computer architecture.

* * * * *